United States Patent [19]

Igoe

[11] 4,242,367

[45] Dec. 30, 1980

[54] MILK SHAKE AND SOFT SERVE FROZEN DESSERT STABILIZER

[75] Inventor: Robert S. Igoe, San Diego, Calif.

[73] Assignee: Merck & Co., Inc., Rahway, N.J.

[21] Appl. No.: 6,611

[22] Filed: Jan. 26, 1979

[51] Int. Cl.³ .................. A23L 1/04; A23G 9/00
[52] U.S. Cl. ..................... 426/573; 426/575; 426/654; 426/565
[58] Field of Search ............. 426/573, 575, 654, 583, 426/565, 566, 567

[56] References Cited

U.S. PATENT DOCUMENTS

| | | | |
|---|---|---|---|
| 2,493,324 | 1/1950 | Steiner et al. | 426/566 |
| 2,823,129 | 2/1958 | Steinitz | 426/654 |
| 3,996,389 | 12/1976 | Osborne | 426/565 |
| 4,058,636 | 11/1977 | Igor | 426/573 |
| 4,081,566 | 3/1978 | Haber | 426/578 |

*Primary Examiner*—Jeanette M. Hunter
*Attorney, Agent, or Firm*—Gabriel Lopez; Hesna J. Pfeiffer; Julian S. Levitt

[57] ABSTRACT

A blend of gums is disclosed which is useful as a milk shake stabilizer. The blend comprises guar, xanthan gum, carrageenan, and, optionally, locust bean gum.

2 Claims, No Drawings

MILK SHAKE AND SOFT SERVE FROZEN DESSERT STABILIZER

BACKGROUND OF THE INVENTION

The gums of this invention are all known to be useful in stabilizing mild products which contain milk solids, fat, sugar, and water in various amounts. They are also used in various combinations. For example, see U.S. Pat. No. 3,996,389, Dec. 7, 1976, which teaches combinations of (1) carageenan with guar and locust bean gum, (2) xanthan gum, locust bean gum and guar gum, and (3) guar gum and xanthan gum in the ratio 99–90-:1–10.

SUMMARY OF THE INVENTION

A novel blend of gums has now been found. This blend contains guar gum, xanthan gum, carrageenan, and, optionally, locust bean gum in the following ratios:

|  | Range |
| --- | --- |
| Guar | 53–68% |
| Xanthan | 20–35 |
| Carrageenan | 9–13 |
| Locust Bean | 0–5 |

At a usage level of 0.14–0.25%, this blend of gums is particularly useful for stabilizing mild compositions containing milk solids, fat, sugar, and water such as milk shakes, soft serve frozen desserts, and like frozen confections.

DETAILED DESCRIPTION OF THE INVENTION

All of the gums of this invention are commercially available. Guar gum, classified as a galactomannan, is a nonionic polysaccharide derived from the seed of the guar plant, *Cyamopsis tetragonolobus*, family Leguminosae.

Xanthan gum is an extracellular polysaccharide derived from an organism of the genus Xanthomonas, preferably from *X. campestris*.

Carrageenan is a mixture of several polysaccharides derived from algae of the class Rhodophyceae (red seaweed), the specific composition depending on the source of the seaweed. Although all of the carrageenans are within the scope of this invention it is preferred that kappa, iota or blends of these be used.

Locust beam gum is also a galactomannan derived from the seed of the locust bean or carob, *Ceratonia siliqua*, family Leguminosae.

These gums are all available in food grade quality with variations depending on source of supply and processing techniques. All of the commercially available products are useable in the invention. It has been found, however, that coarse mesh gums (i.e., those passing through a 20 mesh screen but retained on a 200 mesh screen) are easier to disperse in an aqueous mixture although harder to dissolve whereas finer mesh gums are harder to disperse but easier to dissolve. Where a mix utilizes another ingredient such as sugar which acts to aid dispersion, the finer mesh gums are useable. Where the mix is low in sugar, coarse mesh gums are preferred.

The gum blend of this invention is used to stabilize milk products, specifically those containing fat (either animal or vegetable), sugar and milk, either as whole milk, cream or milk solids to which water is later added. These products can be used to prepare milk shakes, soft serve frozen desserts, and like frozen confections.

In the past, the gums of this invention have been used in various ratios to stabilize milk products. However, it has been found that guar and xanthan gum alone in the ratio 70/30 when used at the useage levels of this invention do not prevent whey-off in, for example, a milk shake mix for prolonged periods of time. Such a mix should be stable for about 10 days in order to ensure useability at retail distribution sites. This allows time for preparation at the factory, distribution to said sites, and storage at the retail site prior to sale to the public. The inclusion of carrageenan, and optionally locust bean gum to the 70/30 guar/xanthan blend imparts such prolonged stability to a milk shake mix, the length of stability depending on the amount of carrageenan added.

The gums of this invention are useable in the following ratios:

|  | Range | Preferred |
| --- | --- | --- |
| Guar | 53–68% | 62.63% |
| Xanthan | 20–35% | 25.95% |
| Carrageenan | 9–13% | 10.52% |
| Locust Bean | 0–5% | 0.90% |

In varying these ratios, it is preferred to keep the guar/xanthan/carrageenan in approximately the ratio 2.41:1:0.40. Where such a blend is used in a milk shake mix at a level of 0.14–0.25% (preferably 0.17 to 0.20), the milk shake mix is stabilized for 10 days, which is necessary and sufficient for the commercial distribution of such a mix. Where lesser amounts of carrageenan are used in such a blend, the length of stabilization is decreased.

The invention is further described in the following examples, which are intended to be illustrative and not limiting. The levels of the various ingredients in the formulation can be achieved by various means. For example, milk solids can be supplied by using commercially available dry milk solids or by using condensed milk or whole milk. When condensed milk or whole milk is used, there is a corresponding decrease in water added.

EXAMPLE 1

Milk Shake Formulation (Laboratory Scale)

Gum blend, milk solids not fat (MSNF), and sugar are added to cream and water in a vat at room temperature and mixed for 10 minutes. The mix is pasteurized via HTST (high temperature, short time) at 79.4° C. for 25 seconds, homogenized at 1800/500 psi and then cooled to 4.4° C. This mix is observed for whey-off and viscosity. The mix is frozen in a Taylor freezer, spindled on a multimixer for 45–60 seconds, and evaluated for firmness, overrun, iciness, and body. During spindling, chocolate or other flavor can optionally be added.

|  |  | % by Weight |  |
| --- | --- | --- | --- |
| Milk solids not fat |  | 9–14 |  |
| Fat |  | 2–4 |  |
| Sucrose |  | 7–10 |  |
| Water |  | 72–82 |  |
| Stabilizer | Level | Visc.* (cP) | Whey-off (7 days) |

| | | | |
|---|---|---|---|
| Guar/xanthan (70/30) gum | 0.2% | 135 | very slight |
| Guar/xanthan (70/30) carrageenan | 0.2 0.015 | 210 | none |

Viscosity is measured in centipoise (cP) in a Brookfield LVT viscometer at 60 rpm, spindle 2, 11° C.

EXAMPLE 2

Milk Shake Formulation (Commercial Dairy Scale)

1090 gallons of mix are prepared with the following composition

| | Weight % |
|---|---|
| MSNF | 9–12 |
| Fat | 2.5–4 |
| Sucrose | 8–10 |
| Water | 74–80.5 |
| Gum Blend | 0.21 |

The gum blend contains 62.63% guar, 25.95% xanthan gum, 10.52% carrageenan, and 0.90% locust bean gum.

The MSNF is supplied as a milk powder which is combined with the gum blend and then incorporated into the other ingredients under moderate agitation in a holding tank. The mix is then HTST pasteurized, homogenized, and packaged under normal dairy conditions. The mix exhibits acceptable viscosity. After 10 days, the mix is inspected and its surface is uniform, thus indicating a lack of whey-off.

EXAMPLE 3

Milk Shake Formulation Using Coconut Oil Instead of Milk Fat

The following milk shake formulation is prepared:

| | % |
|---|---|
| Coconut oil | 3.5 |
| MSNF | 13.0 |
| Sugar | 8.0 |
| Salt | 0.02 |
| Water | 75.25 |
| Guar/xanthan 70/30 | 0.17 |
| Carrageenan | 0.01 |

One aliquot is vat pasteurized at 71.1° C. for 30 minutes, the other via HTST and the following data are obtained:

| | Visc. Initial | (cP) 24 hours |
|---|---|---|
| Vat Sample | 215 | 200 |
| HTST Sample | 205 | 230 |

Part of the two mixes is frozen in a Taylor freezer and chocolate added after removal from the freezer. The milk shakes both exhibit good primary and secondary overrun, good body, and a slight amount of iciness.

The mixes are tested for whey-off as follows. Part of the two mixes is poured into beakers and part into milk cans. After 10 days, the following separation and sedimentation observations are made:

| | Beaker | Can |
|---|---|---|
| Vat Sample | No sep., no sed. | Very slight sep. |
| HTST Sample | Faint sep., no sed | Slight sep. |

What is claimed is:

1. A stabilizer blend of gums for use in milk shakes and soft serve frozen milk desserts which consists essentially of by weight:
   Guar gum: 53–68%
   Xanthan gum: 20–35%
   Carrageenan: 9–13%
   Locust Bean gum: 0–5%

2. A blend of claim 1 which comprises by weight about 62.63% guar gum, about 25.95% xanthan gum, about 10.52% carageenan, and about 0.90% locust bean gum.

* * * * *